United States Patent Office 3,827,986
Patented Aug. 6, 1974

3,827,986
TECHNETIUM-99m GENERATORS
John Cecil Charlton and Dermot Lyons, Amersham, England, assignors to The Radiochemical Centre Limited, Amersham, Buckinghamshire, England
No Drawing. Filed Aug. 4, 1972, Ser. No. 278,082
Claims priority, application Great Britain, Aug. 6, 1971, 37,167/71
Int. Cl. C01f 13/00
U.S. Cl. 252—301.1 R                                9 Claims

ABSTRACT OF THE DISCLOSURE

Yields of technetium-99m, obtained by elution from generators comprising molybdenum-99 adsorbed on an ion-exchange material, are improved by incorporating a hydrated electron scavenger, particularly nitrate or nitrite ion, at low concentration in the aqueous fluid of the generator and/or in the eluant.

---

This invention relates to technetium-99m generators. Technetium-99m decays to technetium-99, with a half-life of 6 hours, by emitting substantially mono-energetic gamma radiation of 0.140 mev. free from $\beta$-radiation. These properties make the isotope of great value for medical purposes. The isotope has been available commercially for several years in the form of a generator consisting of an ion-exchange column of alumina carrying molybdenum-99 in the form of adsorbed molybdate ion. Technetium-99m may be eluted from such columns at suitable intervals, of e.g. 24 hours, in the form of the pertechnetate ion for periods of a week or more.

Technetium-99m generators in common use have normally been eluted with physiological saline solution (0.9% w./v. sodium chloride in sterile pyrogen-free water). For a given physical size of generator yields of technetium-99m obtained from such systems are generally satisfactory provided the activity of the molybdenum-99 parent is below a certain level. In this case the yields of technetium-99m are of the order of 80% of the theoretical maximum. In generators with molybdenum-99 activities higher than this level, the yields of technetium-99m are frequently lower than the desired 80% and liable to fluctuate widely from elution to elution.

The cause of this irregularity has commonly been believed (by those skilled in the art) to be the reduction of the pertechnetate technetium-99m ions generated on the column by reducing species produced in the column by the action of the radiation field of the molybdenum-99/technetium-99m present. The reduced technetium-99m species, unlike the pertechnetate ion, remains firmly adsorbed on the column at elution with a consequent reduction of the yield.

Methods of overcoming this problem have fallen into two groups. In the first case the generator is "over-loaded" with molybdenum-99 to such an extent that the technetium-99m obtained always reached the desired level, that is equivalent to 80% of the "nominal" molybdenum-99 present. This method produces the desired amounts of technetium-99m but is wasteful of molybdenum-99, results in unnecessary radiation dose from the generator, and may be in infringement of various national pharmaceutical legislations.

The second method used is to add strong oxidising agents to the eluent with the intention of re-oxidising any technetium-99m which may be reduced. The commonest additive used in chlorine, added as a hypochlorite solution but specified in terms of its chlorine equivalent. In practice this method is not satisfactory because the strong oxidising agents slowly decompose in aqueous solution, and larger amounts of oxidising agent have to be added to offset this decomposition. These rather large amounts of oxidising agents may interfere with subsequent chemical preparations using the technetium-99m eluate, especially preparations involving reduction of the pertechnetate ion.

This problem of low technetium-99m yields when using generators of high specific activity has faced the industry for several years, and has not been satisfactorily solved. The problem is expected to be of greater importance when molybdenum-99 produced by uranium fission becomes available at pharmaceutically acceptable levels of radionuclidic purity and makes possible the manufacture of generators containing high activities of molybdenum-99 in a small volume of adsorbent, and hence yielding an eluate of high radioactive concentration.

The present invention provides in one aspect a technetium-99m generator comprising molybdenum-99 adsorbed on an ion exchange material in the presence of an aqueous fluid containing at least $10^{-7}$M concentration of a material which is not a strong oxidising agent but which reacts rapidly with hydrated electrons.

As stated above, the molybdenum-99 is generally adsorbed as molybdate ion on a column of alumina in the presence of physiological saline solution.

The existence of hydrated electrons in aqueous solutions of radioactive materials is well known and documented. Hydrated electrons may be regarded as one of the primary reducing species in this case. The react rapidly with strong oxidising agents and with other materials. According to this invention, the aqueous fluid in the generator includes a material that reacts rapidly with hydrated electrons. Such materials are not necessarily strong oxidising agents in the conventional sense. We prefer to use the nitrate ion ($NO_3^-$) which is not a strong oxidising agent under the conditions employed (that is, as a dilute solution in physiological saline), and does not, in general, affect the oxidative and reduction reactions that are customarily performed on the eluate to prepare it for specific medical uses. An alternative material which we have used successfully is nitrite ion ($NO_2^-$).

The cation is not of critical importance; generally, the sodium salts are used, although the free acids or other water-soluble salts, e.g. alkali metal salts, could be used.

Very small amounts of these hydrated electron scavengers can have dramatic effects on the technetium-99m yield. We have obtained what appear to be significant results at concentrations as low as $10^{-7}$M, but prefer to operate with concentrations in the range $10^{-6}$M or $10^{-5}$M to $10^{-3}$M, e.g. about $10^{-4}$M. The upper concentration limit is not critical to the invention, but is rather set by what is acceptable in the eluate. The lower concentration is set by the need to have present a sufficient quantity of hydrated electron scavenger to react with all the hydrated electrons formed during the period over which protection is necessary. Specifically, we prefer to use nitrate ion in a concentration of at least $5 \times 10^{-6}$M, or nitrite ion in a concentration of at least $10^{-5}$M.

Whilst we do not wish to be bound by any theory, we believe that what happens in the generator may be as follows. The technetium-99m is continuously generated from the molybdenum-99 and the stable end product of this process is dissolved pertechnetate ion. Hydrated electrons are also produced in the system, and react with, among other things, the pertechnetate ions, thereby reducing the technetium to some lower valency state where it is adsorbed, like the molybdenum-99, on the alumina. Elution of the column recovers technetium-99m only in the form of dissolved pertechnetate ion.

The presence of dissolved oxygen in the aqueous medium may effectively scavenge the hydrated electrons. It is believed that the occasional presence of dissolved oxygen may account for the high yields that are occasionally obtained from technetium-99m generators of high molybdenum-99 loading in the absence of other hydrated electron scavengers. However, there are no practical means of ensuring sufficiency of dissolved oxygen in the aqueous medium.

The use of strong oxidising agents in the aqueous medium is intended to re-oxidise the reduced technetium, but may also have the effect of scavenging the hydrated electrons. However, as previously stated, strong oxidising agents such as $H_2O_2$, $OCl^-$ or $MnO_4^-$ may slowly decompose in aqueous solution, and may react with other reducible species present, so it is impossible to tell how much oxidising agent remains at any given time. The use of large quantities of strong oxidising agents may be objectionable on medical grounds, and as already noted, may interfere with subsequent chemical operations.

The hydrated electron scavengers used according to the present invention are not strong oxidising agents in the context of this invention and are stable in aqueous solution. They act by removing hydrated electrons to prevent the reduction of dissolved pertechnetate ions, rather than by re-oxidising the reduced technetium.

As previously stated, the yield problem which this invention sets out to overcome only occurs in generators of activity above a certain level. This critical level of activity depends on the size and geometry of the generator, and is quite readily determined by experiment. For our experimental generating columns which contain an absorbent bed 1 cm. diameter by 4 cm. long, the critical level, above which trouble is liable to occur, lies in the region 50 to 100 mCi.

The hydrated electron scavenging compound may conveniently be incorporated into the generator in physiological saline solution, during manufacture of the generator (to ensure a good yield of technetium-99m during the first elution) and in the eluant employed by its user (to ensure good yields in each subsequent elution).

The invention also includes a technetium-99m generating kit, which kit comprises:

(a) a technetium-99m generator comprising molybdeum-99m adsorbed on an ion-exchange material in the presence of an aqueous fluid, optionally containing a material which is not a strong oxidising agent but which reacts rapidly with hydrated electrons, said material, if present, being in a concentration of at least $10^{-7}M$; and (b) an eluant therefor consisting of an aqueous fluid, e.g. a physiological saline solution, containing at least $10^{-7}M$ concentration of a material which is not a strong oxidising agent but which reacts rapidly with hydrated electrons.

The invention also includes a method of generating technetium-99m which method comprises eluting technetium-99m from a generator therefor as defined in (a), using as an eluant the aqueous fluid, e.g. physiological saline solution, defined in (b).

The following Examples illustrate the invention.

EXAMPLE 1

A small glass generator was taken (absorbent bed 1 cm. diameter x 4 cm. long) and loaded under production conditions with 250 mCi of molybdenum-99 at datum (approximately 500 mCi when loaded). After loading it was washed with 30 ml. of physiological saline $10^{-7}M$ in sodium nitrate. It was eluted daily the following week with 10 ml. of the same solution.

The yields, expressed as a percentage of the theoretically obtainable amount of technitium-99m, were as follows:

| Day | Generator activity, mCi | Elution | Yield, percent |
|---|---|---|---|
| Monday | 257 | 1 | 80 |
| Tuesday | 198 | 2 | 104 |
| Wednesday | 156 | 3 | 93 |
| Thursday | 123 | 4 | 97 |
| Friday | 96 | 5 | 93 |

EXAMPLE 2

Two small glass generators were taken (adsorbent beds 1 cm. diameter x 4 cm. long) and loaded with approximately 210 mCi each of molybdenum-99 at the datum at 1200 hrs. GMT on Monday (i.e. about 400 mCi when loaded). They were then treated as set out in the Table below. The elution volume in each case was 10 ml. 10 Elutions were performed on each generator. Elutions 8 and 10 of the generator 1 were satisfactory although eluant used did not contain added nitrate ion. This indicates that the generator activity had by this time fallen below the critical level. All the other results demonstrate the need for nitrate ion in the generator in order to get an acceptable yield of techneticum-99m.

TABLE

| Day | Generator activity, mCi | CDT 1 Elution | | Yield, percent |
|---|---|---|---|---|
| Friday: p.m. | | | Washed with 30 ml N-saline; left over weekend. | |
| Monday: | | | | |
| a.m. | 218 | 1 | N-saline | 53 |
| p.m. | 206 | 2 | do | 53 |
| Tuesday: | | | | |
| a.m. | 171 | 3 | do | 35 |
| | | | After Elution 3 washed with 30 ml. saline $10^{-3}$ M in $NaNO_3$; left 6 hours. | |
| p.m. | 159 | 4 | Saline $NaNO_3$ $10^{-3}$ M | 102 |
| Wednesday: | | | | |
| a.m. | 134 | 5 | do | 93 |
| p.m. | 125 | 6 | do | 92 |
| | | | After Elution 6 washed with 30 ml. M-saline; left overnight. | |
| Thursday: | | | | |
| a.m. | 105 | 7 | N-saline | 41 |
| p.m. | 97 | 8 | do | 85 |
| Friday: | | | | |
| a.m. | 82 | 9 | do | 62 |
| p.m. | 77 | 10 | do | 112 |
| | | CDT 2 | | |
| Friday: p.m. | | | Washed with 30 ml. saline $10^{-3}$ M in $NaNO_3$; let over weekend. | |
| Monday: | | | | |
| a.m. | 218 | 1 | Saline $NaNO_3$, $10^{-3}$ M | 92 |
| p.m. | 206 | 2 | do | 105 |

TABLE—Continued

| Day | Generator ativity, mCi | CDT 2 | | Yield, percent |
|---|---|---|---|---|
| | | | Elution | |
| Tuesday: | | | | |
| a.m. | 171 | 3 | Saline NaNo₃, 10⁻³ M. After Elution 3 washed with 30 ml. N-saline; left 6 hours. | 93 |
| p.m. | 159 | 4 | N-saline. | 30 |
| Wednesday: | | | | |
| a.m. | 134 | 5 | ...do... | 23 |
| p.m. | 125 | 6 | ...do... After Elution 6 washed with 30 ml. saline 10⁻³ M in NaNO₃; left overnight. | 36 |
| Thursday: | | | | |
| a.m. | 105 | 7 | Saline NaNO₃, 10⁻³ M. | 97 |
| p.m. | 97 | 8 | ...do... | 93 |
| Friday: | | | | |
| a.m. | 82 | 9 | ...do... | 92 |
| p.m. | 77 | 10 | ...do... | 90 |

EXAMPLE 3

Technetium-99m generators were fabricated and loaded with molybdenum-99 according to the standard procedures used at The Radiochemical Centre in commercial production of these articles. At its top, the bed of alumina has a short cylindrical portion of 20 mm. diameter, and then tapers to a diameter of 8.5 mm. The total length of bed is about 40 mm. The generators were loaded with molybdenum-99 by passage through them of a solution of ammonium molybdate, Mo-99, in water, having a specific radioactivity in the range 20 to 28 curies per g. of molybdenum. Generators were loaded at three different levels of radioactivity, namely, 3.5 curies, 2.6 curies and 1.7 curies. These activities were chosen to give activities 5 days afer loading of 1 curie, 0.75 curie and 0.5 curie respectively. In the absence of any additive to the isotonic saline, generators at these activity levels were known to give low and erratic yields of Technetium-99m on elution. The generators were eluted daily for 5 days or more, the first elution normally being 3 days after loading. In practice, a generator giving yields of below 70% of the calculated content of Technetium-99m is considered unsatisfactory.

| Additive to eluant | Activity loaded on generators, Ci | Number of generators giving yields | |
|---|---|---|---|
| | | Consistently greater 70% | Below 70% |
| None | 1.7 | 1 | ¹6 |
| | 2.6 | 1 | ¹4 |
| | 3.5 | 0 | ²1 |
| Nitrate, 1 10⁻⁴ molar | 1.7 | 13 | 0 |
| | 2.6 | 5 | 0 |
| | 3.5 | 1 | 0 |
| Nitrate, 1×10⁻⁵ molar | 1.7 | 2 | 0 |
| Nitrite, 5×10⁻⁵ molar | 1.7 | 2 | 0 |

¹ Range 40% to 50%.
² About 40%.

We claim

1. A technetium-99m generator comprising molybdenum-99 adsorbed on alumina in the presence of physiological saline solution, characterized in that the saline solution contains at least $10^{-7}$M concentration of a material which is not a strong oxidizing agent but which reacts rapidly with hydrated electrons, said material being selected from the group consisting of nitrate ion and nitrite ion.

2. A generator as claimed in claim 1 wherein the molybdenum-99 is adsorbed as molybdate ion on a column of alumina in the presence of physiological saline solution.

3. A generator as claimed in claim 1, wherein the concentration of the material which reacts rapidly with hydrated electrons is from $10^{-6}$M to $10^{-3}$M.

4. A generator as claimed in claim 1, wherein the material which reacts rapidly with hydrated electrons is nitrate ion.

5. A generator is claimed in claim 4, wherein the concentration of nitrate ion in the saline solution is at least $5 \times 10^{-6}$M.

6. A generator as claimed in claim 1, wherein the material which reacts rapidly with hydrated electrons is nitrite ion.

7. A generator as claimed in claim 6, wherein the concentration of nitrite ion in the saline solution is at least $10^{-5}$M.

8. A generator as claimed in claim 1, wherein the activity of the generator is at least 100 mCi.

9. In a method of generating a technetium-99m solution, by elution technetium-99m from a generator therefor comprising molybdenum-99 adsorbed on alumina in the presence of physiological saline solution,
the improvement which consists in including in the eluant at least $10^{-7}$M concentration of a material which is not a strong oxidizing agent but which reacts rapidly with hydrated electrons, said material being selected from the group consisting of nitrate ion and nitrite ion.

References Cited
UNITED STATES PATENTS

| | | | |
|---|---|---|---|
| 3,382,152 | 5/1968 | Lieberman | 176—16 |
| 3,664,964 | 5/1972 | Haney et al. | 252—301.1 R |
| 3,436,354 | 4/1969 | Gemmill et al. | 252—301.1 R |
| 3,468,808 | 9/1969 | Arino | 252—301.1 R |

BENJAMIN R. PADGETT, Primary Examiner

R. L. TATE, Assistant Examiner

U.S. Cl. X.R.

23—252; 250—106 T; 423—2, 249; 424—1